(12) United States Patent
Annan (10) Patent No.: US 9,195,981 B2
(45) Date of Patent: Nov. 24, 2015

(54) SYSTEM AND METHOD FOR AUTHORIZING TRANSACTIONS VIA MOBILE DEVICES

(75) Inventor: David Annan, Oakville (CA)

(73) Assignee: IMS HEALTH INCORPORATED, Danbury, CT (US)

( * ) Notice: Subject to any disclaimer, the term of this patent is extended or adjusted under 35 U.S.C. 154(b) by 1016 days.

(21) Appl. No.: 12/604,019

(22) Filed: Oct. 22, 2009

(65) Prior Publication Data

US 2010/0106649 A1    Apr. 29, 2010

Related U.S. Application Data

(60) Provisional application No. 61/107,939, filed on Oct. 23, 2008.

(30) Foreign Application Priority Data

Jun. 11, 2009  (CA) ...................................... 2673030

(51) Int. Cl.
  *G06Q 20/00*   (2012.01)
  *G06Q 20/32*   (2012.01)
  *G06Q 20/36*   (2012.01)

(52) U.S. Cl.
  CPC .............. *G06Q 20/322* (2013.01); *G06Q 20/32* (2013.01); *G06Q 20/3674* (2013.01)

(58) Field of Classification Search
  USPC .......................................................... 705/64
  See application file for complete search history.

(56) References Cited

U.S. PATENT DOCUMENTS

| 7,003,493 B2 | 2/2006 | Weichert et al. | |
| 2001/0027527 A1* | 10/2001 | Khidekel et al. | 713/201 |
| 2002/0052842 A1* | 5/2002 | Schuba et al. | 705/40 |
| 2003/0024979 A1 | 2/2003 | Hansen et al. | |
| 2003/0120592 A1* | 6/2003 | Ng | 705/39 |
| 2004/0230536 A1* | 11/2004 | Fung et al. | 705/64 |
| 2007/0150411 A1 | 6/2007 | Addepalli et al. | |
| 2008/0010191 A1 | 1/2008 | Rackley, III et al. | |

FOREIGN PATENT DOCUMENTS

| WO | 2008027621 A1 | 3/2008 |
| WO | WO 2008027621 A1 * | 3/2008 |

OTHER PUBLICATIONS

CA Office Action mailed Aug. 25, 2014 in reference to CA App. No. 2,668,799; Title: System and Method for Authorizing Transfers Via Mobile Devices.

* cited by examiner

*Primary Examiner* — James A Reagan
(74) *Attorney, Agent, or Firm* — Maldjian Law Group LLC (57) ABSTRACT

A system and method for authorizing transactions via mobile devices is provided. The system includes a mobile device executing a transaction authorization application. The transaction authorization application generates a transaction code for a transaction upon request by a user. The transaction authorization application includes a presentation module for presentation of the transaction code on the mobile device, and a communication module for communicating at least a part of the transaction code over a first channel. A server is in communication with the mobile device over the first channel for receiving the at least partial transaction code. The server is also in communication with a merchant system over a second channel for receiving a transaction request for the transaction. The transaction request includes the transaction code. The server executes transaction processing software for validating the transaction code received via the second channel by determining if the transaction code received via the second channel matches the at least partial transaction code received via the first channel. The server then communicates a transaction response to the merchant system.

21 Claims, 5 Drawing Sheets

SYSTEM AND METHOD FOR AUTHORIZING TRANSACTIONS VIA MOBILE DEVICES

FIELD OF THE INVENTION

The present invention relates to the field of exchange. In particular, it relates to a system and method for authorizing transactions via mobile devices.

BACKGROUND OF THE INVENTION

In a world of ever-increasing complexity, a person can find himself or herself carrying an increasing number of cards, forms of identification and devices. In addition, organizations may find themselves purchasing new hardware or making other expenditures to accommodate for various transaction service providers. In the retail environment, for example, financial institutions issue credit and debit cards to their clients. Each of the credit and debit cards is associated with one or more accounts of a client, and provides both an identification of the account(s) of the client and authentication that the client is entitled to draw from those accounts. As a result, the clients of the financial institutions are generally required to carry such cards with them in order to draw from those accounts. It can be burdensome in some cases for a person to carry around a number of such cards. In addition, should the person forget to bring the appropriate card with him, he may not be able to complete a transaction.

Mobile devices are ubiquitous today. Many people have even cancelled traditional landline telephone services at their residences and/or businesses, and have adopted mobile phones as their primary means of communications. Accordingly, many people typically carry such mobile devices with them wherever they go. For purposes of the discussion hereinbelow, mobile devices include mobile telephones, personal digital assistants, and other portable computing devices that have a network communications interface and an output interface, such as a display. Mobile devices can include a subscriber identification module ("SIM") card that can provide additional capabilities and/or capacity.

It is an object of the invention to provide a novel system and method for authorizing transactions via mobile devices.

SUMMARY OF THE INVENTION

The invention relates to a system and method for authorizing transactions via mobile devices. By receiving a transaction code generated by a mobile phone via a first channel and comparing it to the transaction code received from a merchant system via a second channel, the transaction can be processed quickly and safely.

In accordance with an aspect of the invention, there is provided a system for authorizing transactions via mobile devices, comprising:

a mobile device executing a transaction authorization application, said transaction authorization application generating a transaction code for a transaction upon request by a user, said transaction authorization application including a presentation module for presentation of said transaction code on said mobile device, and a communication module for communicating at least a part of said transaction code over a first channel; and a server in communication with said mobile device over said first channel for receiving said at least partial transaction code, said server being in communication with a merchant system over a second channel for receiving a transaction request for said transaction, said transaction request including said transaction code, said server executing transaction processing software for validating said transaction code received via said second channel by determining if said transaction code received via said second channel matches said at least partial transaction code received via said first channel, said server communicating a transaction response to said merchant system.

The first channel can include a wireless mobile communications network.

The server can compare the transaction code received from the merchant system to the at least partial transaction codes received from a plurality of the mobile devices to determine if the transaction code is valid.

The transaction authorization application can modify the transaction code before presentation of the transaction code on the mobile device. The modification can be reversible.

The transaction authorization application can timestamp the transaction code before presentation of the transaction code on the mobile device.

The transaction authorization application can encrypt the at least partial transaction code before communication to the server.

The transaction code can include a one-time password. The server can validate the one-time password to validate the transaction code.

The transaction authorization application can send the at least partial transaction code to the server for validation prior to presentation on the mobile device. The server can invalidate the at least partial transaction code received via the first channel if the at least partial transaction code received via the first channel matches another of the at least partial transaction codes previously received via the first channel.

The server can encrypt the transaction code received from the merchant system, and compare the encrypted transaction code from the merchant system to the encrypted transaction code received from the mobile device to determine if the transaction request is valid.

The transaction code can be deemed invalid after a period of time.

The server can remove the timestamp from the timestamped transaction code received from the merchant system to recover the transaction code. The server can iteratively attempt to recover the transaction code from the timestamped transaction code by modifying the time used to reverse the timestamp.

In accordance with another aspect of the invention, there is provided a method for authorizing transactions via a mobile authorization payment server, comprising:

receiving, via a first channel, at least part of a transaction code generated by a mobile device for a transaction in response to a request by a user of said mobile device;

storing said at least partial transaction code received from said mobile device in a memory of a server;

receiving, via a second channel, a transaction request from a merchant system, said transaction request including said transaction code;

determining if said transaction code received via said second channel matches said at least partial transaction code received via said first channel; and transferring resources associated with said user for said transaction if said transaction code received via said second channel matches said at least partial transaction code received via said first channel.

The method can further comprise:

comparing the at least partial transaction code received from the mobile device to other at least partial transaction codes received from a plurality of other mobile devices to detect and reject transaction code collisions.

The method can further comprise:

comparing the transaction code from the merchant system to other at least partial transaction codes received from a plurality of the mobile devices to determine if the transaction code is valid.

The method can further comprise:

reversing a modification on the transaction code received from the merchant system.

The reversing can include removing a timestamp from the transaction server. The method can further comprise:

determining if the transaction code has expired.

The at least partial transaction codes from the mobile devices can be encrypted.

The transaction code can include a one-time password, and the method can further comprise:

validating the one-time password.

The removing a timestamp can comprise:

generating an at least partial transaction code candidate from the timestamped transaction code by reversing the timestamp on the timestamped transaction code;

matching the at least partial transaction code candidate against the at least partial transaction codes stored in the memory of the server; and adjusting the time used to reverse the timestamp if the at least partial transaction code candidate does not match one of the at least partial transaction codes stored in the memory of the server.

Other and further advantages and features of the invention will be apparent to those skilled in the art from the following detailed description thereof, taken in conjunction with the accompanying drawings.

BRIEF DESCRIPTION OF THE DRAWINGS

An embodiment will now be described, by way of example only, with reference to the attached Figures, wherein.

DETAILED DESCRIPTION OF THE EMBODIMENT

The invention provides a system and method for authorizing transactions via a mobile device. By providing an application that can be readily installed on a large selection of presently-available and deployed mobile devices, the invention enables transactions to be authorized without the need to provide new hardware, such as RFID chip readers, tags and the like.

The embodiment described herein relates to a consumer payment system for a retail environment. In this embodiment, the transactions are payments for goods or services. A transaction code, referred to with reference to this embodiment as a payment code, is generated by a mobile device and replaces the function of a credit card, a debit card, cash, etc. By receiving at least a portion of a payment code generated by the mobile device via a first channel and receiving, via a second channel, the payment code as entered into a merchant system by a user of the mobile device, the payment code can be readily authenticated and serve to authorize transactions. In addition, by generating and presenting the payment code that uses a credential that is unique to the mobile device, the number of keystrokes that the user of the mobile device provides via a merchant system to authorize a transaction can be reduced.

Figure 1:
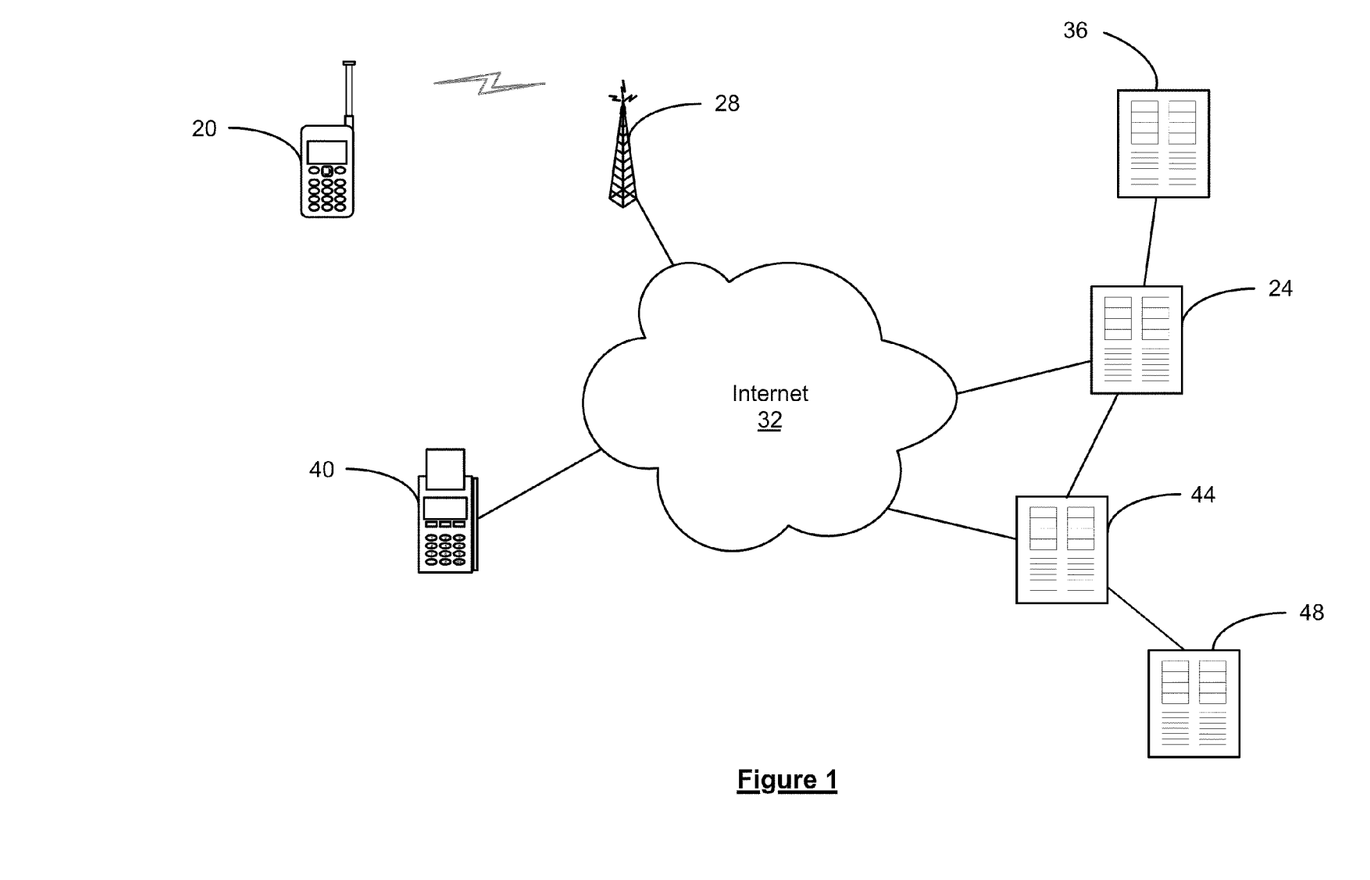
FIG. 1 is a schematic diagram of a system for authorizing transactions via mobile devices and its operating environment in accordance with an embodiment of the invention.

A system for authorizing transactions via mobile devices and its operating environment in accordance with an embodiment of the invention is shown in FIG. 1. A mobile device 20 is in communication with a mobile authorization payment ("MAP") server 24 via a cellular base station 28 and a large, public network, such as the Internet 32. The mobile device 20 communicates wirelessly with the cellular base station 28 via cellular communications, and the cellular base station 28 is coupled to the Internet 32 via a number of intermediate servers operated by a cellular communications carrier (not shown). The MAP server 24 is in communication with the Internet and an OATH validation server 36. The MAP server 24 executes transaction-processing software for authenticating and authorizing transactions.

A merchant system, in this case a merchant terminal 40, is in secure communication with a merchant point-of-sale ("PoS") acquirer server 44 via the Internet 32 (and other networks, in some scenarios, but not shown). Even though the mobile device 20 and the merchant terminal 40 may be within a few feet of each other, each is in communication with the MAP server 24 via different channels. The merchant terminal 40 is located at a point-of-sale, such as at a checkout station in a retail operation. The merchant terminal 40 is a small handheld device that has a swipe slot for reading a credit or debit card, a display for presenting information and menus to a user, a keypad for receiving user input and menu selections and a communication interface for communicating information.

The PoS acquirer server 44 is in secure communication with the MAP server 24 and a financial institution 48 where the user of the mobile device 20 has a financial account. The PoS acquirer server 44 includes a "backend" payment infrastructure. The payment infrastructure features interfaces to credit card and banking facilities permitting commercial fund transfers to support retail transactions.

Figure 2:
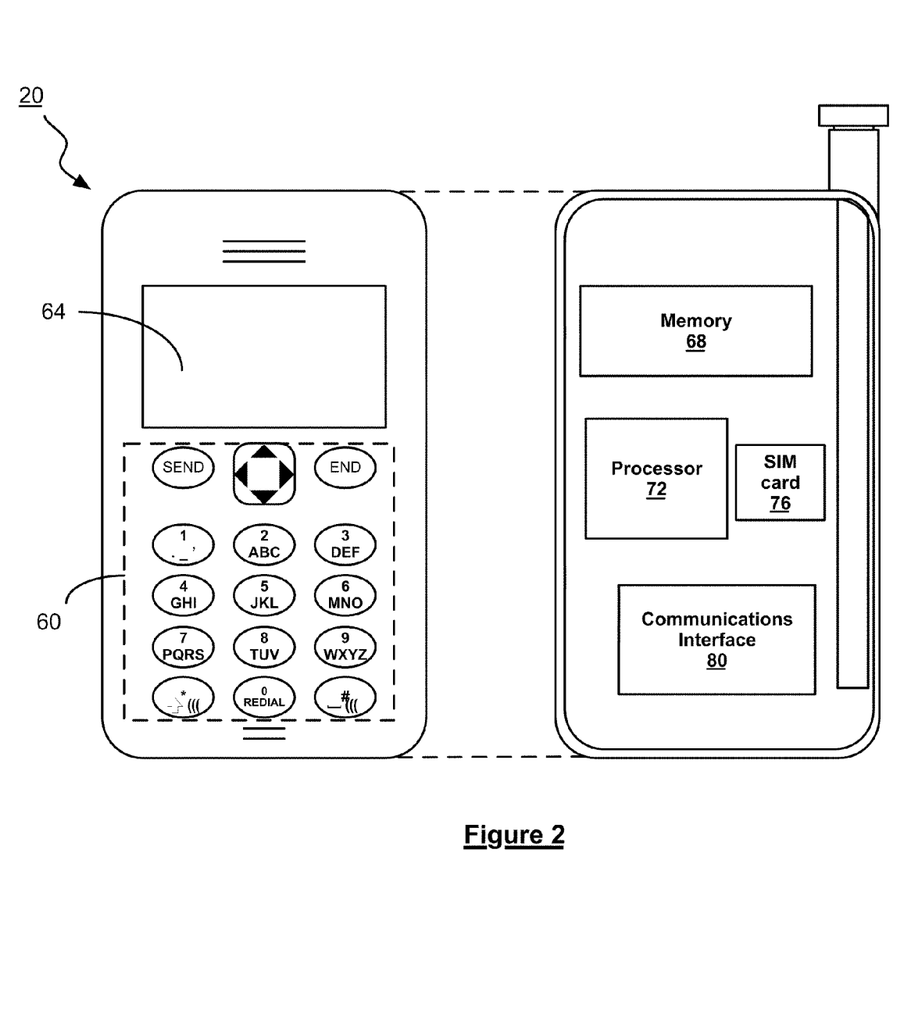
FIG. 2 is a schematic diagram of a mobile device in the system of FIG. 1.

Referring to FIG. 2, a number of components of the mobile device 20 are shown. As illustrated, in this embodiment, the mobile device 20 is a typical mobile phone having basic functions. The mobile device 20 has an input interface 60 for receiving input from a user, and a display 64 is provided for presenting information visually to the user. The mobile device 20 also includes memory 68 for storing an operating system that controls the main functionality of the mobile device 20, along with a number of applications that are run on the mobile device 20, and data. A processor 72 executes the operating system and applications. A SIM card 76 provides additional memory for storing applications and data, and has a microprocessor for executing them. Additionally, the SIM card 76 has a unique hardware identification code that permits identification of the mobile device 20. When installed, the SIM card 76 forms part of the mobile device 20. A communications interface 80 permits communications with a cellular network for voice and data.

In order to enable the mobile device 20 to authorize transactions in accordance with the invention, a transaction authorization application is placed on the mobile device 20. The transaction authorization application can be placed on the mobile device 20 in a number of ways, including, but not limited to, installation of the transaction authorization application in the memory of the mobile device 20 prior to deployment, or downloading and installation of the transaction authorization application on the mobile device 20 after deployment thereof. The transaction authorization application includes a presentation module for outputting information and a communication module for communicating with the MAP server 24.

During installation, the telephone number of the mobile device 20 is registered by the MAP server 24 along with a TokenID that identifies a shared set of security elements, namely a credential and a counter, that are sent securely to the mobile device 20. The credential is a long binary number used as a fixed key for generating one-time passwords ("OTPs"). The counter is an event-based incrementing integer value. The credential and the counter are shared with the MAP server 24 and enable the generation of OTPs by the mobile device 20 and their validation by the MAP server 24. The MAP server 24 registers the telephone number of the mobile device 20, together with the TokenID. The MAP server 24 then transmits the TokenID, the credential and the counter to the OATH validation server 44. The counter is synchronized with the counter stored by the OATH validation server 44 at this time.

In addition, the user provides financial account details and credentials to enable the service to withdraw funds for purchases from the user's financial account. These details are stored along with the telephone number of the mobile device 20 registered to the user by the PoS acquirer server 44 in a user data store. The user establishes a personal identification number and password that will be required to use the transaction authorization application later. The clock of the mobile device is checked during setup of the transaction authorization application against the clock of the MAP server 24 and the user is warned to adjust the clock of the mobile device 20 if a mismatch is found.

Once the transaction authorization application has been installed and configured on the mobile device 20, the mobile device 20 can be used to authorize transactions in accordance with the method described below.

Figure 3:
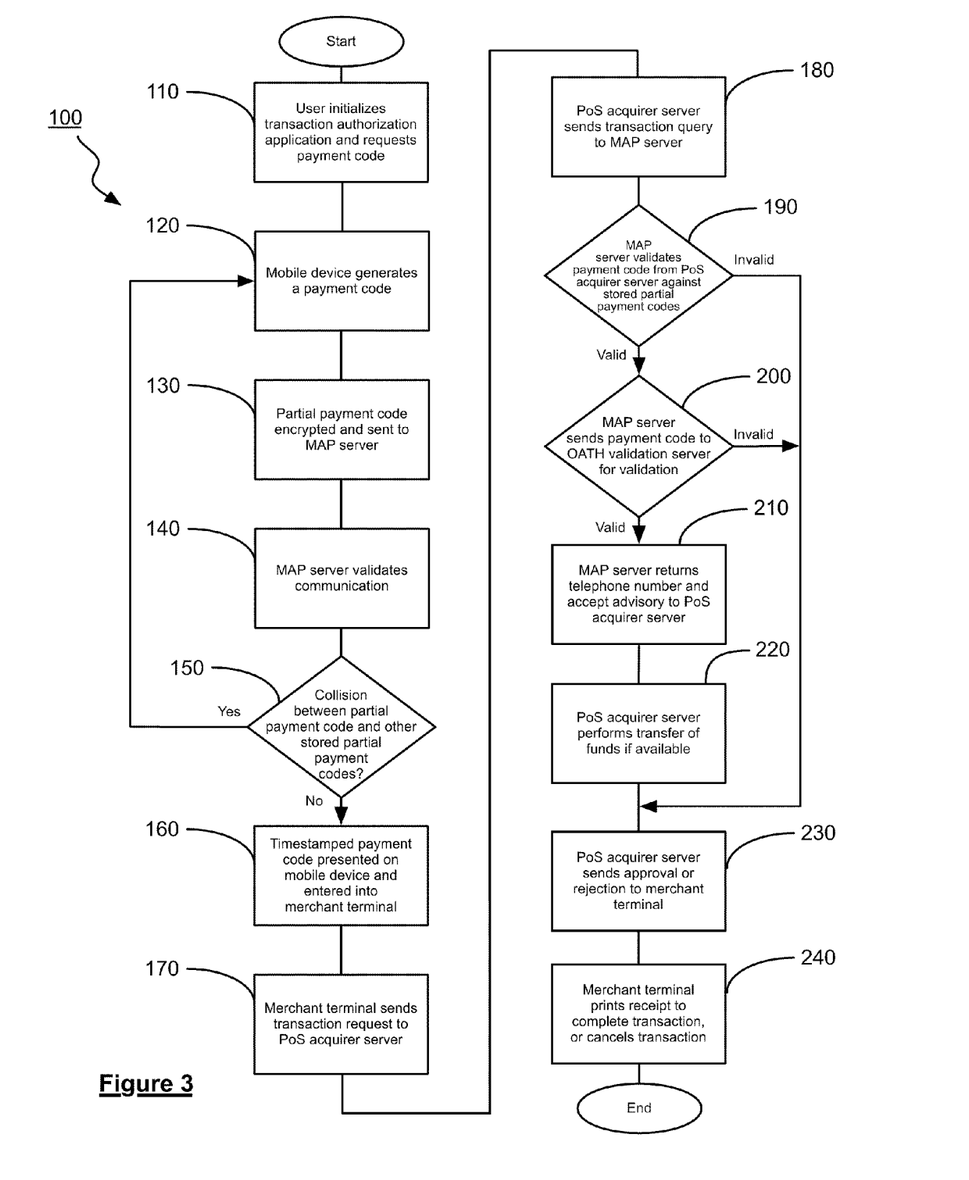
FIG. 3 shows a flowchart of the general method for authorizing transactions via the system of FIG. 1.

FIG. 3 illustrates the method of authorizing a transaction using the system shown in FIG. 1 generally at 100. When a user of the mobile device 20 wishes to purchase an item and approaches a point-of-sale (i.e., a "checkout") for a retail location or the like that employs the system for authorizing transactions via mobile devices, the user indicates to a sales clerk at the checkout that he wishes to pay using the system, referred to as "CodePay", for the transaction. Upon being notified by the customer, the sales clerk selects to process the payment via CodePay at the merchant terminal 40 after which the process of authorizing a transaction begins. In an exemplary alternative scenario, the merchant terminal 40 can permit the user to specify that he wishes to pay using CodePay via a menu presented on the merchant terminal 40 that may include payment by cash, credit card, debit card, etc.

The method begins when the user initializes the transaction authorization application on the mobile device 20 and requests a payment code (step 110). When the transaction authorization application is started up, the user enters the personal identification number and password when prompted by the transaction authorization application visually via the display 64 of the mobile device 20. These are the same personal identification number and password established during setup of the transaction authorization application on the mobile device 20 for the user, and authenticates the user of the mobile device 20 to the transaction authorization application.

Once the user has authenticated himself with the transaction authorization application, the transaction authorization application automatically generates a payment code for the transaction (step 120). In order to generate a payment code, the transaction authorization application generates a one-time password ("OTP") for the transaction. In particular, the transaction authorization application uses the stored counter and credential associated with the TokenID and initialized during the setup of the transaction authorization application to generate the OTP using the standard OATH algorithm as set out in the Internet Engineering Task Force's *HOTP: An HMAC-Based OTP Algorithm* (*RFC* 4226). The resulting payment code is a six to eight-digit number.

Once the transaction authorization application on the mobile device 20 has generated the payment code, it extracts a four to six-digit portion of the payment code, encrypts it and transmits it to the MAP server 24 (step 130). The communication module transmits the encrypted partial payment code and the telephone number associated with the mobile device 20 using a wireless bearer system such as User Datagram Protocol ("UDP") to the cellular base station 28 for forwarding to the MAP server 24. By only sending a portion of the payment code to the MAP server 24 for validation, a person intercepting the communication cannot readily determine the full payment code that is required to authorize a transaction.

Upon receipt of the encrypted partial payment code from the mobile device 20, the MAP server 24 validates the communicated message using a circular redundancy check (step 140). If the communication received from the mobile device 20 is not validated, the MAP server 24 delivers an error message to the transaction authorization application on the mobile device 20.

If the communication received from the mobile device 20 is validated, the MAP server 24 decrypts the partial payment code and determines if there is a collision between the partial payment code and other stored partial payment codes received from mobile devices 20 (step 150). These other partial payment codes are stored in a code validation stack in the memory of the MAP server 24 and represent other transactions waiting to be processed by the MAP server 24. The probability of a random collision between two partial payment codes is approximately $1 \times 10^{-4}$ to $1 \times 10^{-6}$, depending on the chosen partial payment code length. In the exceptional case of a collision, the MAP server 24 sends a request to the transaction authorization application on the mobile device 20 to generate another payment code, after which the method returns to step 120.

If, instead, the partial payment code received from the mobile device 20 does not match any of the partial payment codes already being stored, then the MAP server 24 adds the partial payment code received from the mobile device 20 to the code validation stack, along with the telephone number of the transmitting mobile device 20, and responds to the transaction authorization application on the mobile device 20 with valid receipt acknowledgement. The MAP server 24 stores the newly-received payment code in the code validation stack for a validity period often minutes, matching the lifetime of the payment code.

Upon receipt of the valid receipt acknowledgement response from the MAP server 24, the mobile device 20 modifies the payment code by timestamping it, and then displays the timestamped payment code, which is then entered by the user of the mobile device 20 into the merchant terminal 40 when prompted (step 160). The timestamp is an invertible/reversible mathematical function of the payment code and the time of day. In the particular embodiment, the timestamp is added to the payment code to generate the timestamped payment code. The timestamped payment code is a six to eight-digit number that is treated by the system as valid for the lifetime of the payment code (i.e., ten minutes) from the time the payment code is received. As the timestamped payment code is time-sensitive, it is presented to the user with a countdown timer that indicates the remaining time for which the payment code is valid.

The merchant terminal 40 then forwards a transaction request to the PoS acquirer server 44 (step 170). The transaction request includes both the timestamped payment code entered by the user, and transaction information, such as the amount of money required from the user to complete the transaction. The PoS acquirer server 44 conducts an authentication check on the transaction request to verify that it came from the merchant terminal 40 as part of its standard retail payment operation processing.

The PoS acquirer server 44 then encrypts the payment code and creates a transaction query, which includes the encrypted payment code, that is sent to the MAP server 24 (step 180).

Upon receipt of the transaction query, the MAP server 24 validates the timestamped payment code received from the PoS acquirer server 44 against the stored partial payment codes (step 190).

Figure 4:
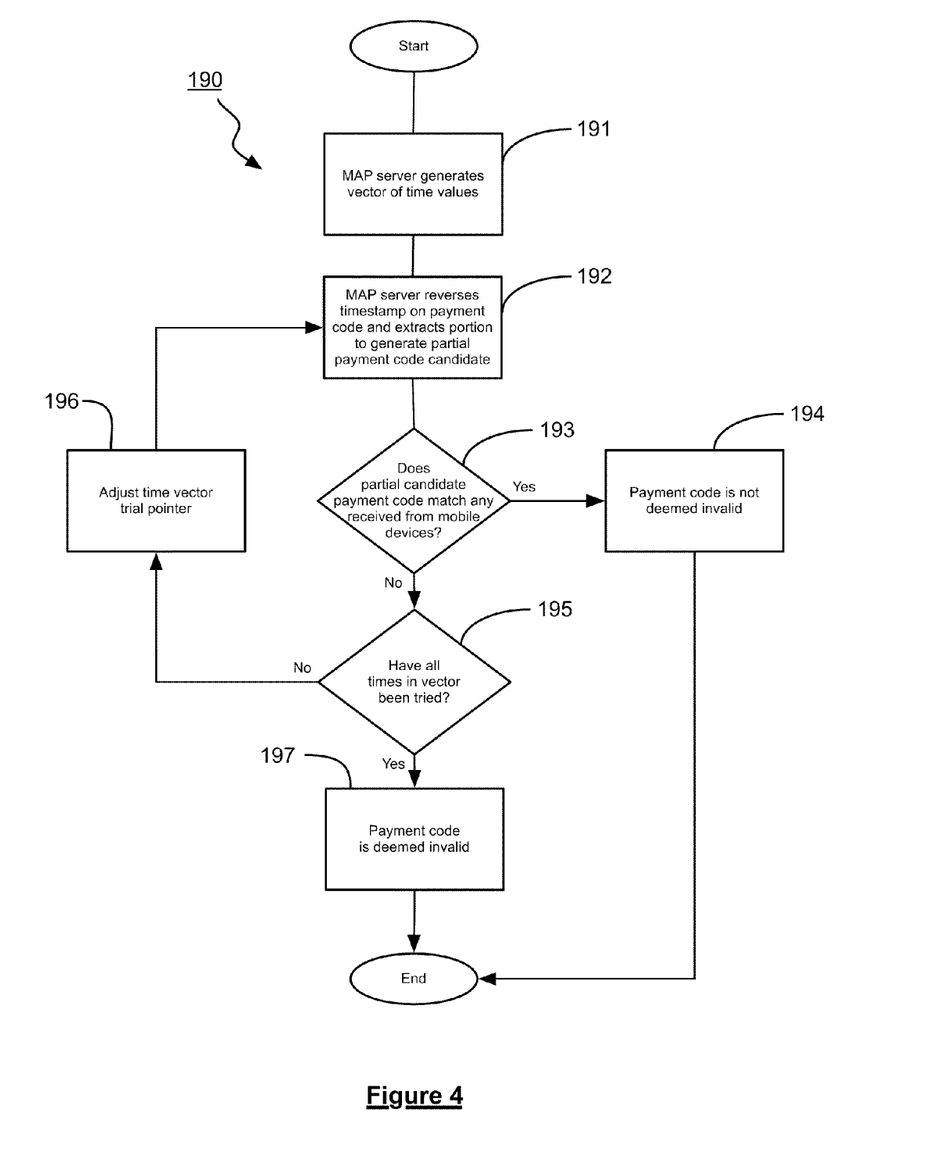
FIG. 4 shows a flowchart of the steps performed during the validation of a transaction code by a mobile authorization payment server in the method of FIG. 3.

FIG. 4 better illustrates the validation of the timestamped payment code received from the merchant terminal 40. As the encrypted payment code received from the mobile device 20 and others like it are not time-stamped, and as the payment code received from the merchant terminal 40 is timestamped, the timestamp is removed from the latter, which is subsequently encrypted, in order to enable comparison. A vector of possible timestamp values is generated (step 191). The vector is generated by listing all integral times within n minutes of the time at which the timestamped payment code was received from the merchant terminal 40. The n-minute range is established to account for discrepancies between the clocks of the mobile device 20 and the MAP server 24, and for delays in receiving the payment code from the merchant terminal 40. With the latter, such delays can include the time it takes for the user to view the timestamped payment code on the mobile device 20 and enter it into the merchant terminal 40, and network delays thereafter in the transmission of the timestamped payment code from the merchant terminal 40 to the MAP server 24.

The MAP server 24 then reverses the timestamp on the timestamped payment code received from the merchant terminal 40 using the first value in the time vector generated at step 191 and extracts the same portion of the payment code as extracted at step 130 to generate a partial payment code candidate (step 192). The MAP server 24 then compares the partial payment code candidate to those previously received from the mobile devices 20 (step 193).

If the partial payment code candidate generated from the timestamped payment code received from the merchant terminal 40 matches a partial payment code in the code validation stack, the timestamped payment code received from the merchant terminal 40 is deemed to not be invalidated at this stage (step 194). In addition, the partial payment code received from a mobile device 20 that matches the partial payment code candidate generated from the timestamped payment code received from the merchant terminal 40 is removed from the code validation stack maintained by the MAP server 24.

If, instead, the MAP server 24 determines that the partial payment code candidate generated from the timestamped payment code received from the merchant terminal 40 does not match any of the partial payment codes in the code validation stack at step 193, the MAP server 24 determines if all of the times in the time vector have been tried (step 195). If all of the times in the time vector have not been tried, the MAP server 24 adjusts the time vector trial pointer to the next time (step 196), which is then used to generate another partial payment code candidate from the timestamped payment code received from the merchant terminal 40 at step 192, which is then matched against the partial payment codes in the code validation stack at step 193. In this manner, the MAP server 24 adjusts the timestamp to values before and after the time that the timestamped payment code was received from the merchant terminal 40 for successive trials. This is repeated until either a partial payment code candidate generated from the timestamped payment code received from the merchant terminal 40 matches a partial payment code in the code validation stack, or the partial payment codes in the code validation stack fail to match any of the partial payment code candidates generated using the values in the time vector. In the latter case, the timestamped payment code received from the merchant terminal 40 is deemed invalid (step 197). If the payment code is deemed invalid, the MAP server 24 returns a reject advisory and a zero-filled telephone number to the PoS acquirer server 44 to indicate an invalid transaction request.

Returning to FIG. 3, if the timestamped payment code received from the merchant terminal 40 has been matched to a partial payment code received from a mobile device 20 within the last ten minutes, the MAP server 24 looks up the TokenID for the particular mobile device 20 using the telephone number received from the mobile device 20 that transmitted the partial payment code in the code validation stack matching the timestamped payment code received from the merchant terminal 40. The MAP server 24 then forwards the payment code generated at step 192 and the TokenID to the OATH validation server 36 for validation (step 200). The OATH validation server 36 validates the payment code received from the MAP server 24 by generating an OTP using the credential and counter associated with the TokenID passed on by the MAP server 24 using the OATH standard validation methodology, and comparing it to the payment code received from the MAP server 24. In order to handle minor de-synchronizations between the counter stored on the mobile device 20 and that stored by the OATH validation server 36, the OATH validation server 36 actually validates over a window of counter values typically including the current counter value and 10-20 counter values ahead when validating an OTP. The counter value is updated to match any stored by the OATH validation server 36 tried counter value yielding an OTP validation to maintain synchronization between the counter values stored by the OATH validation server 36 and the mobile device 20. If none of the tried counter values yields an OTP that matches the OTP received from the mobile device 20, the OTP received from the mobile device 20 is deemed invalid. The OATH validation server 36 then returns a "validated" or "rejected" response back to the MAP server 24, depending on whether the generated payment code matches the OTP received from the MAP server 24.

If the MAP server 24 receives a "validated" response from the OATH validation server 36, the MAP server 24 returns the telephone number of the mobile device 20 and accept advisory to the PoS acquirer server 44 (step 210). The PoS acquirer server 44 securely connects to the financial institution 48 and then requests the transfer of the funds required to complete the transaction as specified in the transaction request (step 220). If there are sufficient funds in the financial account to cover the transaction, the financial institution 48 transfers the funds and sends the PoS acquirer server 44 a confirmation. If, instead, the funds in the financial account are insufficient to cover the transaction, the financial institution 48 rejects the transaction.

The PoS acquirer server 44 then sends the confirmation or rejection of the transaction and the telephone number of the mobile device 20 to the merchant terminal 40 (step 230). If the transaction was rejected by the financial institution, the telephone number of the mobile device 20 is substituted with a string of zeros. The PoS acquirer server 44 records the transaction in an audit log.

Upon receipt of this information, the merchant terminal 40 prints a receipt to complete the transaction, or cancels the transaction (step 240).

Figure 5:
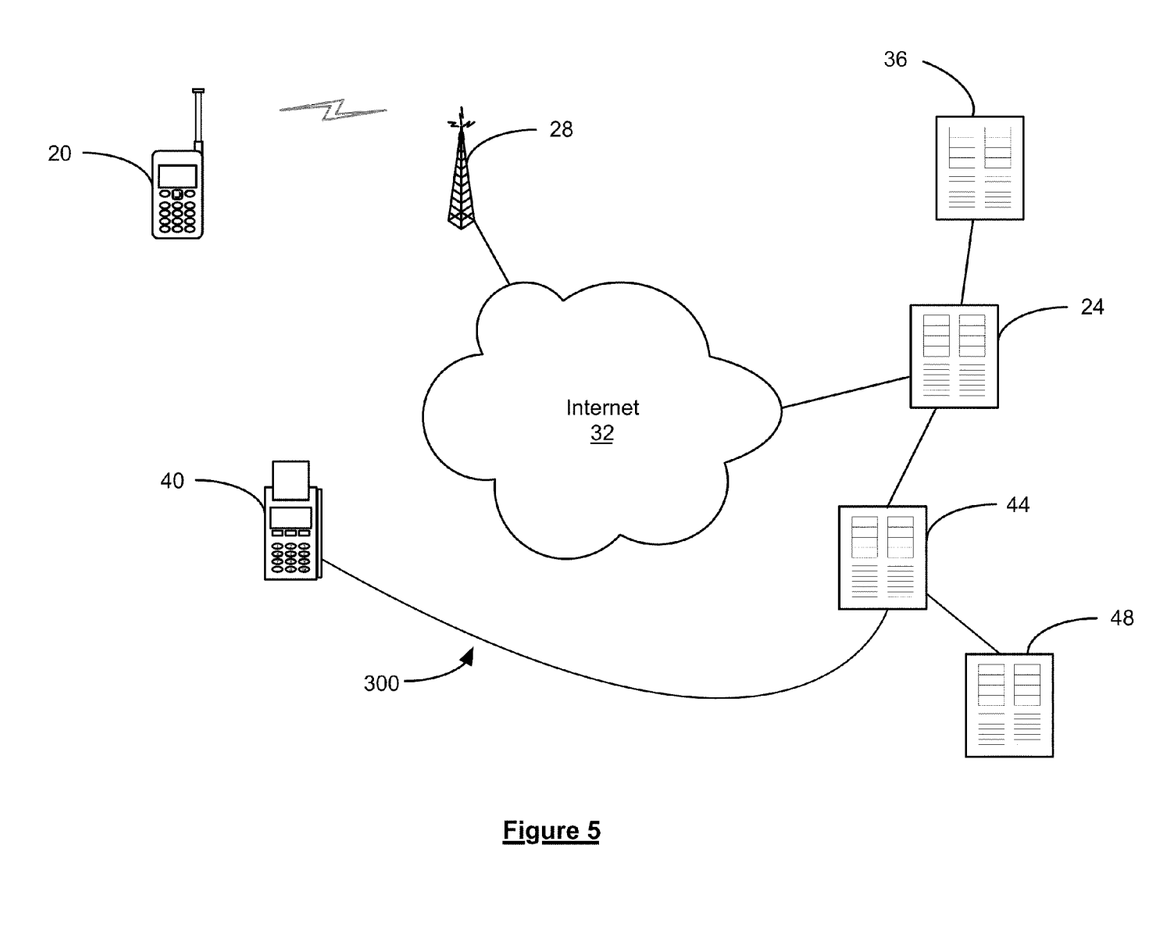
FIG. 5 is a schematic diagram of a system for authorizing transactions via mobile devices in accordance with an alternative embodiment.

FIG. 5 shows the system for authorizing transactions via mobile devices and its operating environment in accordance with an alternative embodiment of the invention. In this case, the merchant terminal 40 is in communication with the PoS acquirer server via a private communications channel 300.

While the invention has been described with specificity to a payment system in a retail environment, it can also be applied to other types of transaction environments. For example, the technique can be used for any time-sensitive secure access application which requires authentication and identification of the originator sufficient to permit non-repudiation of transactions or system access. Examples could include loyalty points processing, credit card validity checking and personal identification applications.

While the MAP server, the PoS acquirer server and the OATH validation server are described as separate servers, those skilled in the art will appreciate that two or more of these servers can be combined, with the desired functionality being provided via separate modules thereon.

The mobile device can use other modes of communication to transmit the payment code to the MAP server. For example, the mobile device can generate a short message service ("SMS") message that is forwarded to a receiving telephone number registered to the MAP server.

The transaction authorization application can be installed on a mobile device in a number of other ways, apart from the manner described above. For example, the transaction authorization application can be installed in the firmware of the mobile device at the factory or by a cellular carrier, placed onto a SIM card before deployment of the SIM card in a mobile device, etc.

Those skilled in the art will appreciate which communications can be unencrypted without compromising the integrity of the system and method.

Other types of transaction codes apart from OTPs can be employed. It can be desirable to create the transaction code using some type of credential(s) installed on the mobile device and a complex algorithm that is very difficult to reproduce or is resistant to the creation of the base credential from a sample of output codes.

The lifetime of the transaction code can be shorter or longer than ten minutes.

While, in the described embodiment, only a portion of the payment code is communicated by the mobile device to the MAP server, the entire payment code can be communicated. Alternatively, a different transformation can be performed on the payment code before communication to the MAP server.

The transaction code can be modified in other ways other than timestamping. For example, other one-way or reversible functions can be applied to the transaction code before display on the mobile device.

The above-described embodiments are intended to be examples of the present invention and alterations and modifications may be effected thereto, by those of skill in the art, without departing from the scope of the invention which is defined solely by the claims appended hereto.

What is claimed is:

1. A system for authorizing transactions via mobile devices, comprising:
   a mobile device executing a transaction authorization application, said transaction authorization application generating a transaction code for a transaction upon request by a user, said transaction authorization application including:
      a presentation module configured to present to the user said transaction code on said mobile device, the transaction code to be entered by the user into a merchant system; and
      a communication module configured to communicate at least a predetermined portion of said transaction code over a first channel; and
   a server in communication with said mobile device over said first channel configured to receive said predetermined portion of said transaction code, said server being in communication with said merchant system over a second channel configured to receive a transaction request for said transaction, said transaction request including said transaction code entered by the user into the merchant system, said server executing transaction processing software configured to validate said transaction code received via said second channel by determining if said transaction code received via said second channel matches said predetermined portion of said transaction code received via said first channel, said server communicating a transaction response to said merchant system,
   wherein said transaction authorization application encrypts said predetermined portion of said transaction code before communication to said server.

2. The system of claim 1, wherein said first channel comprises a wireless mobile communications network.

3. The system of claim 1, wherein said server compares said transaction code received from said merchant system to said predetermined portions of transaction codes received from a plurality of said mobile devices to determine if said transaction code is valid.

4. The system of claim 1, wherein said transaction authorization application modifies said transaction code before presentation of said transaction code on said mobile device.

5. The system of claim 4, wherein said transaction authorization application reversibly modifies said transaction code before presentation of said transaction code on said mobile device.

6. The system of claim 4, wherein said transaction authorization application timestamps said transaction code before presentation of said transaction code on said mobile device.

7. The system of claim 6, wherein said server removes said timestamp from said timestamped transaction code received from said merchant system to recover said transaction code.

8. The system of claim 7, wherein said server iteratively attempts to recover said transaction code from said timestamped transaction code by modifying the time used to reverse the timestamp.

9. The system of claim 1, wherein said transaction code comprises a one-time password.

10. The system of claim 9, wherein said server validates said one-time password to validate said transaction code.

11. The system of claim 1, wherein said transaction authorization application sends said predetermined portion of said transaction code to said server for validation prior to presentation on said mobile device.

12. The system of claim 11, wherein said server invalidates said predetermined portion of said transaction code received via said first channel if said predetermined portion of said transaction code received via said first channel matches another of said predetermined portions of transaction codes previously received via said first channel, wherein said previously received predetermined portions of transaction codes represent respective transactions different than a current transaction.

13. The system of claim 1, wherein said transaction code is deemed invalid after a period of time.

14. A method for authorizing transactions, comprising:
receiving, via a first channel, a predetermined portion of a transaction code generated by a mobile device for a transaction in response to a request by a user of said mobile device;
storing said predetermined portion of the transaction code received from said mobile device in a memory of a server, wherein said predetermined portions of transaction codes from said mobile devices are encrypted;
receiving, via a second channel, a transaction request from a merchant system, said transaction request including said transaction code displayed to said user and manually entered by said user at the merchant system;
determining if said transaction code received via said second channel matches said predetermined portion of said transaction code received via said first channel; and
transferring resources associated with said user for said transaction if said transaction code received via said second channel matches said predetermined portion of said transaction code received via said first channel.

15. The method of claim 14, further comprising:
comparing said predetermined portion of said transaction code received from said mobile device to other said predetermined portions of transaction codes received from a plurality of other said mobile devices to detect and reject transaction code collisions of codes representing respective separate transactions and the predetermined portion of said transaction code for a present transaction.

16. The method of claim 14, further comprising:
comparing said transaction code from said merchant system to said predetermined portions of transaction codes received from a plurality of said mobile devices to determine if said transaction code is valid.

17. The method of claim 14, further comprising:
reversing a modification on said transaction code received from said merchant system.

18. The method of claim 17, wherein reversing comprises removing a timestamp from said transaction server.

19. The method of claim 18, further comprising:
determining if said transaction code has expired.

20. The method of claim 18, wherein said removing a timestamp comprises:
generating a predetermined portion of said transaction code candidate from said timestamped transaction code by reversing said timestamp on said timestamped transaction code;
matching said predetermined portion of said transaction code candidate against said predetermined portions of transaction codes stored in said memory of said server; and
adjusting the time used to reverse said timestamp if said predetermined portion of said transaction code candidate does not match one of said predetermined portions of transaction codes stored in said memory of said server.

21. The method of claim 14, wherein said transaction code comprises a one-time password, the method further comprising:
validating said one-time password.

* * * * *